(12) United States Patent
Takatani et al.

(10) Patent No.: US 12,104,096 B2
(45) Date of Patent: *Oct. 1, 2024

(54) LAMINATED CORE, LAMINATED CORE MANUFACTURING METHOD, AND ELECTRIC MOTOR

(71) Applicant: NIPPON STEEL CORPORATION, Tokyo (JP)

(72) Inventors: Shinsuke Takatani, Tokyo (JP); Hiroyasu Fujii, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 17/296,583

(22) PCT Filed: Dec. 17, 2019

(86) PCT No.: PCT/JP2019/049293
§ 371 (c)(1),
(2) Date: May 25, 2021

(87) PCT Pub. No.: WO2020/129941
PCT Pub. Date: Jun. 25, 2020

(65) Prior Publication Data
US 2022/0025228 A1    Jan. 27, 2022

(30) Foreign Application Priority Data
Dec. 17, 2018   (JP) .................................. 2018-235867

(51) Int. Cl.
*C09J 163/00*   (2006.01)
*B32B 7/12*   (2006.01)
(Continued)

(52) U.S. Cl.
CPC ............... *C09J 163/00* (2013.01); *B32B 7/12* (2013.01); *B32B 15/011* (2013.01); *C09J 11/06* (2013.01);
(Continued)

(58) Field of Classification Search
CPC .................................. B32B 7/12; B32B 7/14
See application file for complete search history.

(56) References Cited

U.S. PATENT DOCUMENTS 3,386,058 A   5/1968   Michel
4,025,379 A   5/1977   Whetstone
(Continued)

FOREIGN PATENT DOCUMENTS

CN   102792556 A   11/2012
EP   3553799 A1   10/2019
(Continued)

OTHER PUBLICATIONS

Japanese Industrial Standard (JIS) C 2552: 2014, relevance discussed in specification.
(Continued)

*Primary Examiner* — Adam Krupicka
(74) *Attorney, Agent, or Firm* — Renner, Otto, Boisselle & Sklar, LLP

(57) ABSTRACT

Provided is an electric motor using a laminated core in which punched electrical steel sheets are adhered to each other with a high adhesion strength. The laminated core includes: a plurality of electrical steel sheets which are stacked on each other and of which both surfaces are coated with an insulation coating; and an adhesion part which is disposed between the electrical steel sheets adjacent to each other in a stacking direction and adheres the electrical steel sheets to each other, wherein all sets of the electrical steel sheets adjacent to each other in the stacking direction are (Continued)

adhered to each other by the adhesion parts, wherein the adhesion parts are provided at a plurality of positions between the electrical steel sheets, and wherein the adhesion part is a layer made of an adhesive containing any one or both of an acrylic resin and an epoxy resin and having an SP value of 7.8 to 10.7 $(cal/cm^3)^{1/2}$.

14 Claims, 4 Drawing Sheets

(51) Int. Cl.
| | |
|---|---|
| B32B 15/01 | (2006.01) |
| C09J 11/06 | (2006.01) |
| C09J 133/12 | (2006.01) |
| C09J 151/08 | (2006.01) |
| H01F 41/02 | (2006.01) |
| H02K 1/12 | (2006.01) |
| H02K 15/02 | (2006.01) |
| C08K 5/5399 | (2006.01) |

(52) U.S. Cl.
CPC ........... *C09J 133/12* (2013.01); *C09J 151/08* (2013.01); *H02K 1/12* (2013.01); *H02K 15/02* (2013.01); *C08K 5/5399* (2013.01); *C09J 2203/326* (2013.01); *H01F 41/02* (2013.01)

(56) References Cited

U.S. PATENT DOCUMENTS

| | | | |
|---|---|---|---|
| 4,103,195 A | 7/1978 | Torossian | |
| 4,413,406 A | 11/1983 | Bennett | |
| 5,142,178 A | 8/1992 | Kloster et al. | |
| 5,248,405 A | 9/1993 | Kaneda et al. | |
| 5,338,996 A | 8/1994 | Yamamoto | |
| 5,448,119 A | 9/1995 | Kono et al. | |
| 5,994,464 A | 11/1999 | Ohsawa et al. | |
| 6,495,936 B2 | 12/2002 | Kikuchi et al. | |
| 6,653,758 B2 | 11/2003 | Tsuneyoshi et al. | |
| 7,298,064 B2 | 11/2007 | Yamamoto | |
| 7,562,439 B2 | 7/2009 | Yamamoto | |
| 7,859,163 B2 | 12/2010 | Bertocchi et al. | |
| 7,952,254 B2 | 5/2011 | Cho et al. | |
| 8,015,691 B2 | 9/2011 | Miyake | |
| 8,580,217 B2 | 11/2013 | Hipszki et al. | |
| 8,581,468 B2 | 11/2013 | Kudose et al. | |
| 8,697,811 B2 | 4/2014 | Kishi et al. | |
| 8,943,677 B2 | 2/2015 | Gerster et al. | |
| 9,331,530 B2 | 5/2016 | Jang et al. | |
| 9,512,335 B2 | 12/2016 | Hoshi et al. | |
| 9,770,949 B2 | 9/2017 | Fudemoto et al. | |
| 9,833,972 B2 | 12/2017 | Ohishi et al. | |
| 10,328,673 B2 * | 6/2019 | Hamamura | B32B 15/011 |
| 10,340,754 B2 | 7/2019 | Ogino et al. | |
| 10,348,170 B2 | 7/2019 | Izumi et al. | |
| 10,476,321 B2 | 11/2019 | Li et al. | |
| 10,491,059 B2 | 11/2019 | Murakami et al. | |
| 10,547,225 B2 | 1/2020 | Hattori et al. | |
| 10,574,112 B2 | 2/2020 | Tomonaga | |
| 10,819,201 B2 | 10/2020 | Thumm et al. | |
| 10,840,749 B2 | 11/2020 | Chaillou et al. | |
| 11,056,934 B2 | 7/2021 | Kubota et al. | |
| 11,616,407 B2 | 3/2023 | Hino et al. | |
| 2002/0047459 A1 | 4/2002 | Adaeda et al. | |
| 2002/0163277 A1 | 11/2002 | Miyake et al. | |
| 2004/0056556 A1 | 3/2004 | Fujita | |
| 2004/0124733 A1 | 7/2004 | Yamamoto et al. | |
| 2006/0043820 A1 | 3/2006 | Nakahara | |
| 2007/0024148 A1 | 2/2007 | Maita et al. | |
| 2007/0040467 A1 | 2/2007 | Gu | |
| 2007/0182268 A1 | 8/2007 | Hashiba et al. | |
| 2009/0026873 A1 | 1/2009 | Matsuo et al. | |
| 2009/0195110 A1 | 8/2009 | Miyaki | |
| 2009/0230812 A1 | 9/2009 | Cho et al. | |
| 2010/0090560 A1 | 4/2010 | Myojin | |
| 2010/0197830 A1 | 8/2010 | Hayakawa et al. | |
| 2010/0219714 A1 | 9/2010 | Abe et al. | |
| 2010/0244617 A1 | 9/2010 | Nobata et al. | |
| 2011/0180216 A1 | 7/2011 | Miyake | |
| 2011/0269894 A1 | 11/2011 | Miyamoto | |
| 2012/0088096 A1 | 4/2012 | Takeda et al. | |
| 2012/0128926 A1 | 5/2012 | Ohishi et al. | |
| 2012/0156441 A1 | 6/2012 | Gerster | |
| 2012/0235535 A1 | 9/2012 | Watanabe | |
| 2012/0288659 A1 | 11/2012 | Hoshi et al. | |
| 2013/0244029 A1 | 9/2013 | Igarashi et al. | |
| 2014/0023825 A1 | 1/2014 | Igarashi et al. | |
| 2015/0028717 A1 | 1/2015 | Luo et al. | |
| 2015/0097463 A1 | 4/2015 | Blocher et al. | |
| 2015/0130318 A1 | 5/2015 | Kitada et al. | |
| 2015/0256037 A1 | 9/2015 | Kudose | |
| 2015/0337106 A1 | 11/2015 | Kajihara | |
| 2016/0023447 A1 | 1/2016 | Shimizu | |
| 2016/0352159 A1 | 12/2016 | Li et al. | |
| 2016/0352165 A1 | 12/2016 | Fubuki | |
| 2017/0117758 A1 | 4/2017 | Nakagawa | |
| 2017/0287625 A1 | 10/2017 | Ito | |
| 2017/0342519 A1 | 11/2017 | Uesaka et al. | |
| 2017/0368590 A1 | 12/2017 | Senda et al. | |
| 2018/0030292 A1 | 2/2018 | Gotou | |
| 2018/0056629 A1 | 3/2018 | Hamamura | |
| 2018/0134926 A1 | 5/2018 | Lei et al. | |
| 2018/0159389 A1 | 6/2018 | Nishikawa | |
| 2018/0212482 A1 | 7/2018 | Nigo | |
| 2018/0248420 A1 | 8/2018 | Enokizono et al. | |
| 2018/0295678 A1 | 10/2018 | Okazaki et al. | |
| 2018/0309330 A1 | 10/2018 | Ueda | |
| 2018/0342925 A1 | 11/2018 | Horii et al. | |
| 2019/0010361 A1 | 1/2019 | Hoshi | |
| 2019/0040183 A1 | 2/2019 | Yoshida et al. | |
| 2020/0048499 A1* | 2/2020 | Andou | C09J 4/06 |
| 2020/0099263 A1 | 3/2020 | Hirosawa et al. | |
| 2020/0186014 A1 | 6/2020 | Kusuyama | |
| 2021/0296975 A1 | 9/2021 | Hino et al. | |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 62-009951 A | 1/1987 |
| JP | 63-207639 A | 8/1988 |
| JP | 01-168777 A | 7/1989 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |

(56) References Cited

FOREIGN PATENT DOCUMENTS

| | | |
|---|---|---|
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 5423465 B2 | 2/2014 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2017-0087915 A | 7/2017 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.
The papers of technical meetings in the Institute of Electrical Engineers of Japan,RM-92-79, 1992.
Matweb, "Plaskolite West Optix® CA-41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).
Datasheet of Nylon 6, Cast (Year: N/A, Printed Jun. 28, 2023).

* cited by examiner

LAMINATED CORE, LAMINATED CORE MANUFACTURING METHOD, AND ELECTRIC MOTOR

TECHNICAL FIELD

The present invention relates to a laminated core, a laminated core manufacturing method, and an electric motor.

Priority is claimed on Japanese Patent Application No. 2018-235867, filed Dec. 17, 2018, the content of which is incorporated herein by reference.

BACKGROUND ART

Conventionally, a laminated core in which a plurality of electrical steel sheets are laminated on each other is known as a core used in an electric motor. The plurality of electrical steel sheets are bonded to each other by methods such as welding, adhering, and fastening.

Patent Document 1 discloses a laminated core in which punched electrical steel sheets are adhered to each other by an epoxy resin or acrylic resin.

CITATION LIST

Patent Document

[Patent Document 1]
Japanese Unexamined Patent Application, First Publication No. 2004-88970

SUMMARY OF THE INVENTION

Problems to be Solved by the Invention

However, in the related art as in Patent Document 1, sufficient adhesion strength between the punched electrical steel sheets cannot be easily obtained.

An object of the present invention is to provide a laminated core in which punched electrical steel sheets are adhered to each other with a high adhesion strength, a method of manufacturing the same, and an electric motor including the same.

Means for Solving the Problem

An embodiment of the present invention has the following aspects.

[1] A laminated core including:
  a plurality of electrical steel sheets which are stacked on each other and of which both surfaces are coated with an insulation coating; and
  an adhesion part which is disposed between the electrical steel sheets adjacent to each other in a stacking direction and adheres the electrical steel sheets to each other,
  wherein all sets of the electrical steel sheets adjacent to each other in the stacking direction are adhered to each other by a plurality of the adhesion parts between the electrical steel sheets,
  wherein the adhesion parts are provided at a plurality of positions between the electrical steel sheets, and
  wherein the adhesion part is made of an adhesive containing any one or both of an acrylic resin and an epoxy resin and having an SP value of 7.8 to 10.7 $(cal/cm^3)^{1/2}$.

[2] The laminated core according to [1],
  wherein the adhesive is an epoxy resin-based adhesive containing an epoxy resin and a phenol novolac resin.

[3] The laminated core according to [2],
  wherein the epoxy resin-based adhesive is an adhesive composed of 100 parts by mass of an epoxy resin and 5 to 35 parts by mass of a phenol novolac resin.

[4] The laminated core according to [2],
  wherein the epoxy resin-based adhesive is an adhesive composed of 100 parts by mass of an epoxy resin, 5 to 35 parts by mass of a phenol novolac resin, and 5 to 50 parts by mass of an elastomer.

[5] The laminated core according to [2],
  wherein the epoxy resin-based adhesive is an adhesive composed of 100 parts by mass of an epoxy resin, 5 to 35 parts by mass of a phenol novolac resin, and 5 to 10 parts by mass of a solvent having an SP value of 7.0 to 10.7 $(cal/cm^3)^{1/2}$.

[6] The laminated core according to [2],
  wherein the epoxy resin-based adhesive further contains an acrylic resin.

[7] The laminated core according to [6],
  wherein the epoxy resin-based adhesive is an adhesive composed of 100 parts by mass of an acrylic modified epoxy resin graft-polymerized with an acrylic resin and 5 to 35 parts by mass of a phenol novolac resin.

[8] The laminated core according to [6],
  wherein the epoxy resin-based adhesive is an adhesive composed of 100 parts by mass of an acrylic modified epoxy resin graft-polymerized with an acrylic resin, 5 to 35 parts by mass of a phenol novolac resin, and 5 to 50 parts by mass of an elastomer.

[9] The laminated core according to [1],
  wherein the adhesive is an epoxy resin-based adhesive containing an epoxy resin having a glass transition temperature of 120 to 180° C. and an organophosphorus compound.

[10] The laminated core according to [1],
  wherein the adhesive is an epoxy resin-based adhesive composed of 100 parts by mass of an epoxy resin and 5 to 35 parts by mass of an organophosphorus compound.

[11] The laminated core according to [1],
  wherein the adhesive is an epoxy resin-based adhesive containing an epoxy resin, an epoxy resin curing agent, and an elastomer, and
  wherein an average tensile modulus of elasticity of the adhesion part at a room temperature is 1500 to 5000 MPa and an average tensile modulus of elasticity thereof at 150° C. is 1000 to 3000 MPa.

[12] The laminated core according to any one of [1] to [11],
  wherein the laminated core is an adhesively-laminated core for a stator.

[13] An electric motor including:
  the laminated core according to any one of [1] to [12].

[14] A method of manufacturing the laminated core according to [1],
  wherein an operation of applying the adhesive to a surface of the electrical steel sheet, stacking the electrical sheet on another electrical sheet, press-stacking the electrical steel sheets, and forming the adhesion part is repeated.

Effects of the Invention

According to the present invention, it is possible to provide a laminated core in which punched electrical steel sheets are adhered to each other with a high adhesion strength, a method of manufacturing the same, and an electric motor including the same.

EMBODIMENTS FOR IMPLEMENTING THE INVENTION

Hereinafter, an adhesively-laminated core for a stator according to an embodiment of the present invention and an electric motor including the adhesively-laminated core for a stator will be described with reference to the drawings. Additionally, in this embodiment, a motor which is an electric motor, specifically, an AC motor, more specifically, a synchronous motor, and further specifically, a permanent magnetic electric motor will be described as an example. This type of motor is suitably used in, for example, an electric vehicle or the like.

Figure 1:
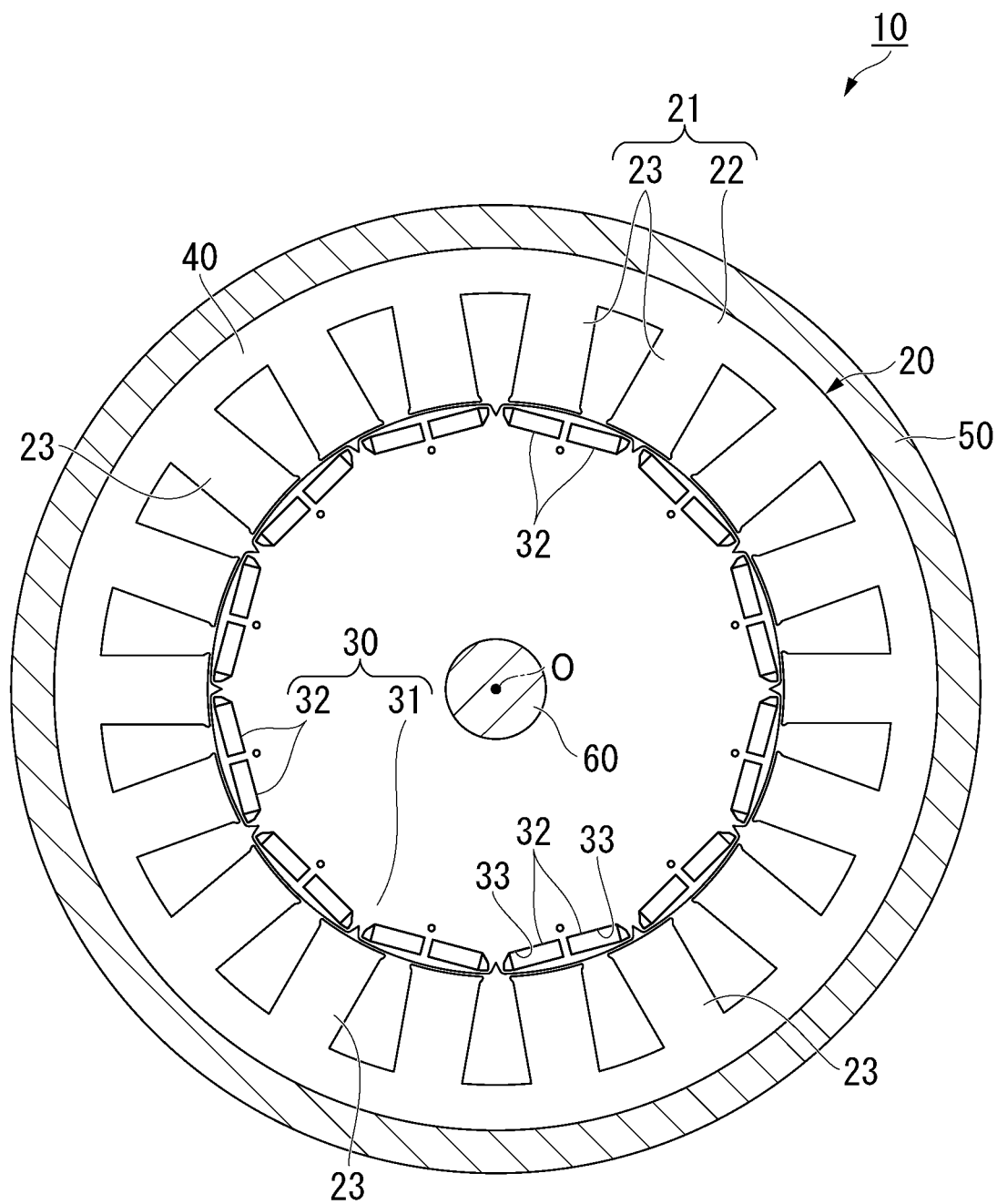
FIG. 1 is a cross-sectional view of an electric motor including an adhesively-laminated core for a stator according to an embodiment of the present invention.

As shown in FIG. 1, an electric motor 10 includes a stator 20, a rotor 30, a casing 50, and a rotary shaft 60. The stator 20 and the rotor 30 are accommodated in the casing 50. The stator 20 is fixed to an inside of the casing 50.

In this embodiment, an inner rotor type in which the rotor 30 is located on the inside of the stator 20 in the radial direction is employed as the electric motor 10. However, an outer rotor type in which the rotor 30 is located on the outside of the stator 20 may be employed as the electric motor 10. Further, in this embodiment, the electric motor 10 is a 12-pole and 18-slot three-phase AC motor. However, the number of poles, the number of slots, the number of phases, and the like can be changed as appropriate.

The electric motor 10 can rotate at a rotation speed of 1000 rpm, for example, by applying an excitation current having an effective value of 10 A and a frequency of 100 Hz to each phase.

The stator 20 includes an adhesively-laminated core for a stator (hereinafter, a stator core) 21 and a winding (not shown).

The stator core 21 includes an annular core back part 22 and a plurality of tooth parts 23. Hereinafter, a direction along a central axis O of the stator core 21 (or the core back part 22) is referred to as the axial direction, a radial direction of the stator core 21 (or the core back part 22) (i.e., a direction orthogonal to the central axis O) is referred to as the radial direction, and a circumferential direction of the stator core 21 (or the core back part 22) (i.e., a direction revolving around the central axis O) is referred to as the circumferential direction.

The core back part 22 is formed in an annular shape in a plan view of the stator 20 along the axial direction.

The plurality of tooth parts 23 protrudes from an inner periphery of the core back part 22 inward in the radial direction (toward the central axis O of the core back part 22 in the radial direction). The plurality of tooth parts 23 are arranged at equal angular intervals in the circumferential direction. In the present embodiment, eighteen tooth parts 23 are provided at the intervals of the central angle of 20° around the central axis O. The plurality of tooth parts 23 are formed to have the same shape and the same size with each other. Thus, the plurality of tooth parts 23 have the same thickness dimension with each other.

The windings are wound on the tooth parts 23. The windings may be a concentrated windings or a distributed windings.

The rotor 30 is disposed on the inside of the radial direction with respect to the stator 20 (the stator core 21). The rotor 30 includes a rotor core 31 and a plurality of permanent magnets 32.

The rotor core 31 is formed in an annular shape (an annular ring shape) to be arranged coaxially with the stator 20. The rotary shaft 60 is disposed inside the rotor core 31. The rotary shaft 60 is fixed to the rotor core 31.

The plurality of permanent magnets 32 are fixed to the rotor core 31. In the present embodiment, a set of two permanent magnets 32 forms one magnetic pole. A plurality of sets of permanent magnets 32 are arranged at equal angular intervals in the circumferential direction. In the present embodiment, twelve sets of permanent magnets 32 (twenty four in total) are provided at the intervals of the central angles of 30° around the central axis O.

In the present embodiment, an interior permanent magnet motor is adopted as the permanent magnetic electric motor. A plurality of through holes 33 penetrating the rotor core 31 in the axial direction are formed in the rotor core 31. The plurality of through holes 33 are provided to correspond to an arrangement of the plurality of permanent magnets 32. Each permanent magnet 32 is fixed to the rotor core 31 in a state in which it is disposed inside the corresponding through hole 33. Fixing of each permanent magnet 32 to the rotor core 31 can be realized, for example, in such a manner that the outer surface of the permanent magnet 32 and the inner surface of the through hole 33 are adhered by the adhesive. Additionally, as the permanent magnetic electric motor, a surface permanent magnet motor may be adopted instead of the interior permanent magnet motor.

Figure 2:
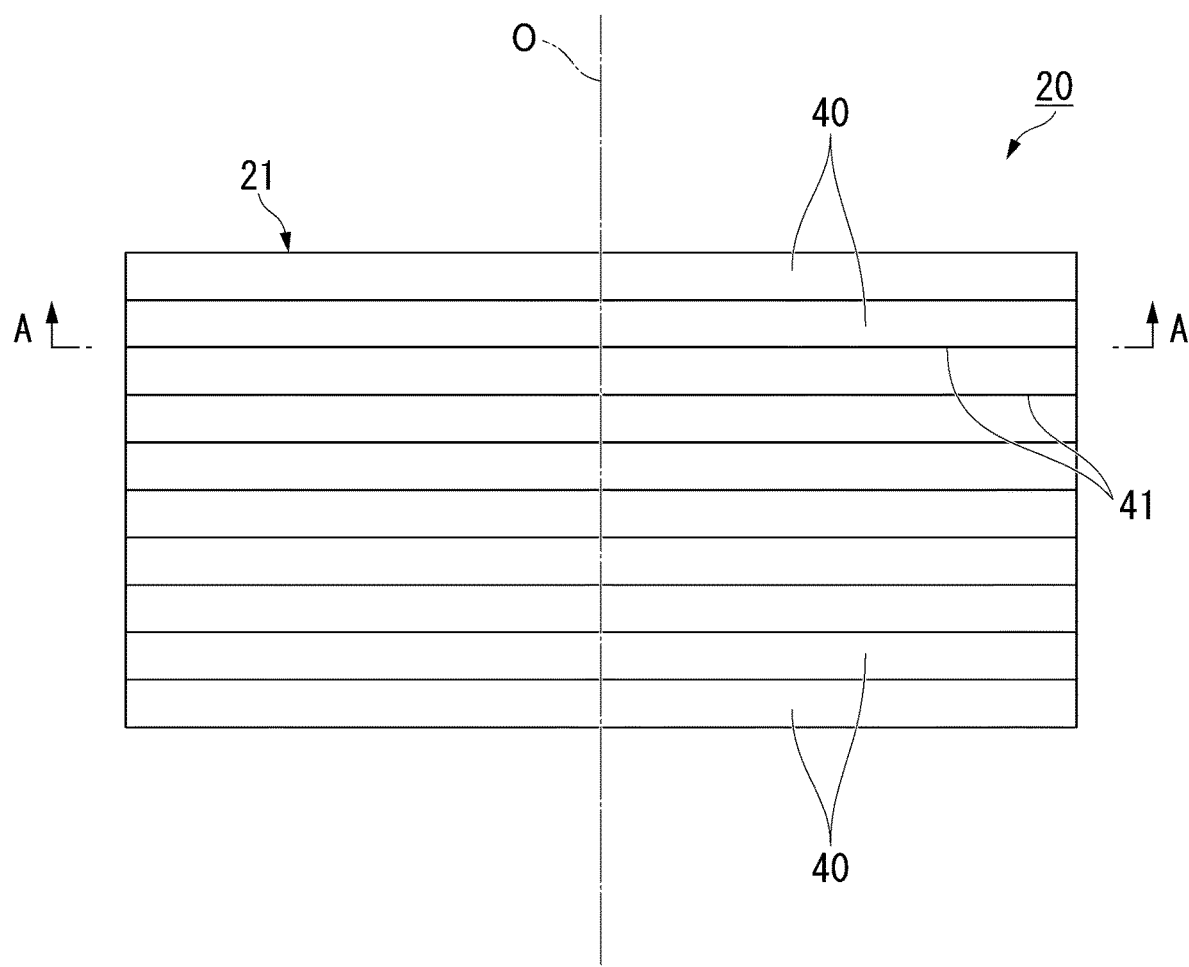
FIG. 2 is a side view of the laminated core for a stator.

The stator core 21 and the rotor core 31 are both laminated cores. For example, as shown in FIG. 2, the stator core 21 is formed by stacking a plurality of electrical steel sheets 40.

Additionally, the lamination thickness (the entire length along the central axis O) of each of the stator core 21 and the rotor core 31 is, for example, 50.0 mm. An outer diameter of the stator core 21 is, for example, 250.0 mm. An inner diameter of the stator core 21 is, for example, 165.0 mm. An outer diameter of the rotor core 31 is, for example, 163.0 mm. An inner diameter of the rotor core 31 is, for example, 30.0 mm. However, these values are examples, and the lamination thickness, the outer diameter, and the inner diameter of the stator core 21, and the lamination thickness, the outer diameter, and the inner diameter of the rotor core 31 are not limited to these values. Here, the inner diameter of the stator core 21 is based on the tip of the tooth part 23 of the stator core 21. That is, the inner diameter of the stator core 21 is a diameter of a virtual circle inscribed in the tips of all tooth parts 23.

Each of the electrical steel sheets 40 forming the stator core 21 and the rotor core 31 is formed, for example, by punching an electrical steel sheet as a base material. As the electrical steel sheet 40, a known electrical steel sheet can be used. A chemical composition of the electrical steel sheet 40 is not particularly limited. In the present embodiment, as the electrical steel sheet 40, a non-grain-oriented electrical steel sheet is used. As the non-grain-oriented electrical steel sheet, for example, a non-grain-oriented electrical steel strip of JIS C 2552:2014 can be adopted.

However, as the electrical steel sheet 40, it is also possible to use a grain-oriented electrical steel sheet instead of the non-grain-oriented electrical steel sheet. As the grain-oriented electrical steel sheet, a grain-oriented electrical steel strip of JIS C 2553:2012 can be adopted.

In order to improve the workability of the electrical steel sheet or the iron loss of the laminated core, Insulation coatings are provided on both surfaces of the electrical steel sheet 40. As a material constituting the insulation coating, for example, (1) an inorganic compound, (2) an organic resin, (3) a mixture of an inorganic compound and an organic resin, and the like can be adopted. As the inorganic compound, for example, (1) a complex of dichromate and boric acid, (2) a complex of phosphate and silica, and the like can be exemplified. As the organic resin, an epoxy resin, an acrylic resin, an acrylic styrene resin, a polyester resin, a silicone resin, and fluorine resin, and the like can be exemplified.

In order to ensure the insulating performance between the electrical steel sheets 40 laminated with each other, the thickness of the insulation coating (thickness per one surface of the electrical steel sheet 40) is preferably 0.1 μm or more.

On the other hand, the insulation effect becomes saturated as the insulation coating becomes thick. Further, as the insulation coating becomes thicker, a space factor decreases and the performance as the stator core decreases. Thus, the insulating coating may be as thin as possible within a range capable of ensuring the insulation performance. The thickness of the insulation coating (the thickness per one surface of the electrical steel sheet 40) is preferably 0.1 μm or more and 5 μm or less and more preferably 0.1 μm or more and 2 μm or less.

As the sheet thickness of the electrical steel sheet 40 becomes thinner, an effect of improving the iron loss gradually becomes saturated. Further, as the electrical steel sheet 40 becomes thinner, the manufacturing costs of the electrical steel sheet 40 increase. Therefore, the thickness of the electrical steel sheet 40 is preferably 0.10 mm or more in consideration of the effect of improving the iron loss and the manufacturing costs.

On the other hand, when the electrical steel sheet 40 is too thick, the press punching work of the electrical steel sheet 40 becomes difficult. Therefore, the thickness of the electrical steel sheet 40 is preferably 0.65 mm or less in consideration of the press punching work of the electrical steel sheet 40.

Further, the iron loss increases as the electrical steel sheet 40 becomes thick. Therefore, the thickness of the electrical steel sheet 40 is preferably 0.35 mm or less and more preferably 0.20 mm or 0.25 mm in consideration of the iron loss characteristics of the electrical steel sheet 40.

In consideration of the above points, the thickness of each electrical steel sheet 40 is, for example, 0.10 mm or more and 0.65 mm or less, preferably 0.10 mm or more and 0.35 mm or less, and more preferably 0.20 mm or 0.25 mm. Additionally, the thickness of the electrical steel sheet 40 includes the thickness of the insulation coating.

As shown in FIG. 2, in the stator core 21, a plurality of adhesion parts 41 which adhere the electrical steel sheets 40 to each other is provided between all sets of the electrical steel sheets 40 adjacent to each other in the stacking direction. All sets of the electrical steel sheets 40 which are adjacent to each other in the stacking direction are adhered to each other by the plurality of adhesion parts 41 between the electrical steel sheets 40. That is, the plurality of electrical steel sheets 40 forming the stator core 21 are stacked with the adhesion part 41 interposed therebetween. The electrical steel sheets 40 which are adjacent to each other in the stacking direction are not fixed by other means (for example, fastening or the like).

The adhesion part 41 is used to adhere the electrical steel sheets 40 which are adjacent to each other in the stacking direction. The adhesion part 41 is a part which is formed of an adhesive (hereinafter, an adhesive (X)) that contains any one or both of an acrylic resin and an epoxy resin and has an SP value of 7.8 to 10.7 $(cal/cm^3)^{1/2}$. That is, the adhesion part 41 is the adhesive (X) which is cured without being divided.

The SP value means a solubility parameter defined by Hildebrand. The SP value of the adhesive (X) is measured from the solubility of the cured product obtained by curing the adhesive (X) in various solvents having a known SP value. More specifically, the SP value is measured by the method described in Examples.

In the present specification, "to" indicating a numerical range means that the numerical values described before and after "to" are included as the lower limit value and the upper limit value.

When a plurality of punched electrical steel sheets are stacked while being adhered to each other by an adhesive used in general to obtain a laminated core, it is difficult to obtain sufficient adhesion strength between the electrical steel sheets compared to a case in which the punching is not performed. This is because punching oil used at the time of punching remains on the lamination surface of the electrical steel sheet and exists between the adhesive and the lamination surface of the electrical steel sheet at the time of laminating. As a result, this oil disturbs the adhering.

It is considered that the SP value of the punching oil is close to that of cyclohexane (SP value: 8.2 $(cal/cm^3)^{1/2}$) or toluene (SP value: 8.9 $(cal/cm^3)^{1/2}$). In the present invention, since the SP value of the adhesive (X) is controlled in the range of 7.8 to 10.7 $(cal/cm^3)^{1/2}$, compatibility with punching oil is excellent. Accordingly, the adhesive (X) exhibits excellent oil accommodating adhesiveness in the lamination of the punched electrical steel sheets and the electrical steel sheets are adhered to each other with high adhesion strength. Therefore, it is possible to obtain the stator core 21 having high mechanical strength and low noise and vibration.

Further, when the SP value of the adhesive (X) is in the range of 7.8 to 10.7 $(cal/cm^3)^{1/2}$, a laminated core having low noise and vibration is obtained even when there is a difference between the SP value of the adhesive (X) and the SP value of the punching oil.

The SP value of the adhesive (X) is preferably 8.0 to 10.0 $(cal/cm^3)^{1/2}$ and more preferably 8.2 to 8.9 $(cal/cm^3)^{1/2}$ because oil accommodating adhesiveness is improved.

It is more preferable to set the SP value of the adhesive (X) to an optimum range depending on the type of punching oil. For example, when the punching oil is mineral oil, the SP value of the adhesive (X) is more preferably 8.2 to 8.9 $(cal/cm^3)^{1/2}$. When the punching oil is isoparaffin, the SP value of the adhesive (X) is more preferably 7.8 to 8.5 $(cal/cm^3)^{1/2}$. When the punching oil is toluene, the SP value of the adhesive (X) is more preferably 8.5 to 9.3 $(cal/cm^3)^{1/2}$.

As a method of adjusting the SP value of the adhesive (X), for example, in the case of an epoxy resin-based adhesive, a method of graft-polymerizing an acrylic resin on an epoxy resin can be exemplified. When the acrylic resin is graft-polymerized on the epoxy resin, the SP value tends to decrease. In this case, the SP value tends to decrease as the polymerization degree of the acrylic resin increases. Further, the SP value can be adjusted by blending an additive to the adhesive (X). For example, when the adhesive (X) is the epoxy resin-based adhesive, the SP value of the adhesive (X) can be decreased by blending an additive having an SP value smaller than that of the epoxy resin (SP value: about 10.9 $(cal/cm^3)^{1/2}$), that is, a lower polarity.

The additive for adjusting the SP value of the adhesive (X) may be any additive that does not affect the adhesiveness of the adhesive (X) or the performance of the electric motor. For example, at least one solvent can be exemplified from a group having an SP value of 7.0 to 10.7 $(cal/cm^3)^{1/2}$ and consisting of n-pentane (SP value: 7.0 $(cal/cm^3)^{1/2}$), n-hexane (SP value: 7.3 $(cal/cm^3)^{1/2}$), diethyl ether (SP value: 7.4 $(cal/cm^3)^{1/2}$), n-octane (SP value: 7.6 $(cal/cm^3)^{1/2}$), vinyl chloride (SP value: 7.8 $(cal/cm^3)^{1/2}$), cyclohexane, isobutyl acetate (SP value: 8.3 $(cal/cm^3)^{1/2}$), isopropyl acetate (SP value: 8.4 $(cal/cm^3)^{1/2}$), butyl acetate (SP value: 8.5 $(cal/cm^3)^{1/2}$), carbon tetrachloride (SP value: 8.6 $(cal/cm^3)^{1/2}$), methylpropylketone (SP value: 8.7 $(cal/cm^3)^{1/2}$), xylene (SP value: 8.8 $(cal/cm^3)^{1/2}$), toluene, ethyl acetate (SP value: 9.1 $(cal/cm^3)^{1/2}$), benzene (SP value: 9.2 $(cal/cm^3)^{1/2}$), methyl ethyl ketone (SP value: 9.3 $(cal/cm^3)^{1/2}$), methylene chloride (SP value: 9.7 $(cal/cm^3)^{1/2}$), acetone (SP value: 9.9 $(cal/cm^3)^{1/2}$), carbon disulfide (SP value: 10.0 $(cal/cm^3)^{1/2}$), acetic acid (10.1 $(cal/cm^3)^{1/2}$), and n-hexanol (SP value: 10.7 $(cal/cm^3)^{1/2}$). Further, the SP value of the adhesive (X) can be decreased by blending an elastomer such as synthetic rubber having a small SP value to be described later. The additive to be blended in the adhesive (X) may be one type or two or more types.

As the adhesive (X), an epoxy resin-based adhesive containing an epoxy resin or an acrylic resin-based adhesive containing an acrylic resin can be exemplified. Additionally, the acrylic resin-based adhesive does not contain an epoxy resin. The epoxy resin-based adhesive is preferable because of the excellent heat resistance and adhesiveness.

The epoxy resin-based adhesive contains an epoxy resin and a curing agent. From the viewpoint of excellent heat resistance, fast curing, and oil accommodating adhesiveness, an epoxy resin-based adhesive further containing an acrylic resin in addition to the epoxy resin and the curing agent is preferable. An epoxy resin-based adhesive containing an acrylic modified epoxy resin obtained by graft-polymerizing an acrylic resin on an epoxy resin may be used.

The epoxy resin is not particularly limited and, for example, a bisphenol A type epoxy resin, a bisphenol F type epoxy resin, a bisphenol AD type epoxy resin, a glycidylamine type epoxy resin, and an alicyclic epoxy resin can be exemplified. Among these, the bisphenol F type epoxy resin is preferable from the viewpoint of low viscosity and excellent workability. The epoxy resin contained in the epoxy resin-based adhesive may be one type or two or more types.

A glass transition temperature (Tg) of the epoxy resin is preferably 80 to 150° C., more preferably 100 to 150° C., and even more preferably 120 to 150° C. When the Tg of the epoxy resin is equal to or higher than the lower limit value of the range, it is easy to obtain a stator core having excellent heat resistance and high mechanical strength. When the Tg of the epoxy resin is equal to or lower than the upper limit value of the range, it is easy to obtain adhesion with the steel sheet.

Additionally, the Tg of the epoxy resin is an midpoint glass transition temperature measured by a differential scanning calorimetry (DSC) method according to JIS K 7121-1987.

The number average molecular weight (Mn) of the epoxy resin is preferably 1200 to 20000, more preferably 2000 to 18000, and even more preferably 2500 to 16000. When the Mn of the epoxy resin is equal to or larger than the lower limit value of the range, it is easy to increase adhesion strength. When the Mn of the epoxy resin is equal to or smaller than the upper limit value of the range, it is easy to suppress the high viscosity of the epoxy resin-based adhesive.

Additionally, the Mn of the epoxy resin can be measured by size-exclusion chromatography (SEC) described in JIS K 7252-1: 2008 using polystyrene as a standard substance.

The curing agent is not particularly limited and an epoxy resin curing agent used in general can be used. The curing agent may be of a low temperature or room temperature curing type or may be of a thermosetting type. As specific examples of the curing agent, for example, aliphatic polyamines, aromatic polyamines, acid anhydrides, phenol novolac resins, organophosphorus compounds, and dicyandiamides (DICY) can be exemplified. The curing agent contained in the epoxy resin-based adhesive may be one type or two or more types.

As the aliphatic polyamine, for example, triethylenetetramine, diethylenetriamine (DTA), and diethylaminopropylamine (DEAPA) can be exemplified.

As the aromatic polyamine, for example, diaminodiphenylmethane (DDM), meta-phenylenediamine (MPDA), and diaminodiphenyl sulfone (DDS) can be exemplified.

As the acid anhydride, for example, phthalic acid anhydride, hexahydrophthalic acid anhydride, and 4-methylhexahydrophthalic acid anhydride can be exemplified.

The phenol novolac resin is a novolac type phenol resin obtained by subjecting phenols (phenols and the like) and aldehydes (formaldehyde and the like) to a condensation reaction using an acid catalyst.

The organic phosphorus compound is not particularly limited and, for example, hexamethyl phosphate triamide, tri (dichloropropyl) phosphate, tri (chloropropyl) phosphate, triphenyl phosphite, trimethyl phosphate, phenylphosphonic acid, triphenylphosphine, tri-n-butylphosphine, and diphenylphosphine can be exemplified.

As the curing agent, from the viewpoint of excellent heat resistance, a heat-curing type curing agent is preferable, a phenol novolac resin and an aromatic polyamine are more preferable, and, from the viewpoint that a stator core having high mechanical strength can be easily obtained, a phenol novolac resin is particularly preferable. When two or more types of epoxy resin curing agents are used, for example, an aspect in which a phenol novolac resin is used as a main component and an aromatic polyamine is blended can be mentioned.

The amount of the curing agent in the epoxy resin-based adhesive can be appropriately set according to the type of curing agent. For example, when a phenol novolac resin is used, 5 to 35 parts by mass are preferable with respect to 100 parts by mass of the epoxy resin. When an organophosphorus compound is used as the curing agent, the amount of the organophosphorus compound is preferably 5 to 35 parts by mass with respect to 100 parts by mass of the epoxy resin.

A curing accelerator may be added to the epoxy resin-based adhesive. As the curing accelerator, for example, tertiary amines, secondary amines, and imidazoles can be exemplified. The curing accelerator contained in the epoxy resin-based adhesive may be one type or two or more types.

The acrylic resin is not particularly limited. As the monomer used for the acrylic resin, for example, unsaturated carboxylic acids such as acrylic acid and methacrylic acid and (meth) acrylate such as methyl (meth) acrylate, ethyl (meth) acrylate, n-butyl (meth) acrylate, isobutyl (meth) acrylate, cyclohexyl (meth) acrylate, 2-ethylhexyl (meth) acrylate, 2-hydroxyethyl (meth) acrylate, and hydroxypropyl (meth) acrylate can be exemplified. The (meth) acrylate means acrylate or methacrylate. The acrylic resin contained in the adhesive (X) may be one type or two or more types.

When the acrylic resin is used as the adhesive, it may be contained as a monomer forming the acrylic resin in the adhesive before curing.

The number average molecular weight (Mn) of the acrylic resin is preferably 5000 to 100000, more preferably 6000 to 80000, and even more preferably 7000 to 60000. When the Mn of the acrylic resin is equal to or larger than the lower limit value of the range, it is easy to increase the adhesion strength. When the Mn of the acrylic resin is equal to or smaller than the upper limit value of the range, it is easy to suppress the high viscosity of the adhesive (X).

Additionally, the Mn of the acrylic resin can be measured in the same method as that of the Mn of the epoxy resin.

When the epoxy resin-based adhesive contains the acrylic resin, the amount of the acrylic resin is not particularly limited and can be set to, for example, 20 to 80 mass % with respect to the total amount of the epoxy resin and the acrylic resin. The same applies to the amount of the acrylic resin in the acrylic modified epoxy resin obtained by graft-polymerizing the acrylic resin and the amount of the acrylic resin can be set to, for example, 20 to 80 mass % with respect to the total mass of the acrylic modified epoxy resin.

The epoxy resin adhesive may contain an elastomer. When the elastomer is blended, the average tensile modulus of elasticity of the adhesion part 41 can be controlled in a specific range and hence there is a contribution to improvement of viscosity and flowing characteristics.

As the elastomer, natural rubber and synthetic rubber can be exemplified, and the synthetic rubber is preferable. The elastomer contained in the epoxy resin-based adhesive may be one type or two or more types.

As the synthetic rubber, for example, polybutadiene-based synthetic rubber, nitrile-based synthetic rubber, and chloroprene-based synthetic rubber can be exemplified.

As the polybutadiene-based synthetic rubber, for example, isoprene rubber (IR), butadiene rubber (BR), styrene butadiene rubber (SBR), polyisobutylene (butyl rubber, IIR), and ethylene propylene diene rubber (EPDM) can be exemplified. As the nitrile-based synthetic rubber, for example acrylonitrile butadiene rubber (NBR) and acrylic rubber (ACM) can be exemplified. As the chloroprene-based synthetic rubber, chloroprene rubber (CR) can be exemplified.

The elastomer such as EPDM (SP value: 7.9 to 8.0 $(cal/cm^3)^{1/2}$), SBR (SP value: 8.1 to 8.7 $(cal/cm^3)^{1/2}$), BR (SP value: 8.1 to 8.6 $(cal/cm^3)^{1/2}$), and NBR (SP value: 8.7 to 10.5 $(cal/cm^3)^{1/2}$) having an SP value smaller than that of the epoxy resin can be used to adjust the SP value of the adhesive (X). When such an elastomer is used, the average tensile modulus of elasticity can be also controlled while improving oil accommodating adhesiveness. Further, when the elastomer having an SP value smaller than that of the epoxy resin is blended in the adhesive (X), the laminated core can be designed particularly for low vibration and noise. A mechanism having low vibration and noise due to the blending of the elastomer is not always clear, but this is considered because the adhesion strength between the electrical steel sheets and the vibration-absorbing performance increase due to the elastomer having a small SP value.

As a preferable epoxy resin-based adhesive, an adhesive containing an epoxy resin and a phenol novolac resin, an adhesive containing an epoxy resin, a phenol novolac resin, and an acrylic resin, an adhesive containing an epoxy resin having a Tg of 120 to 180° C. and an organophosphorus compound, and an adhesive containing an epoxy resin, an epoxy resin curing agent, and an elastomer can be exemplified.

As a more preferable epoxy resin-based adhesive, adhesives (X1) to (X6) having the following compositions can be exemplified.

Adhesive (X1): Adhesive composed of 100 parts by mass of an epoxy resin and 5 to 35 parts by mass of a phenol novolac resin.

Adhesive (X2): Adhesive composed of 100 parts by mass of an epoxy resin and 5 to 35 parts by mass of an organophosphorus compound.

Adhesive (X3): Adhesive composed of 100 parts by mass of an epoxy resin, 5 to 35 parts by mass of a phenol novolac resin, and 5 to 50 parts by mass of an elastomer.

Adhesive (X4): Adhesive composed of 100 parts by mass of an acrylic modified epoxy resin obtained by graft-polymerizing an acrylic resin and 5 to 35 parts by mass of a phenol novolac resin.

Adhesive (X5): Adhesive composed of 100 parts by mass of an acrylic modified epoxy resin obtained by graft-polymerizing an acrylic resin, 5 to 35 parts by mass of a phenol novolac resin, and 5 to 50 parts by mass of an elastomer.

Adhesive (X6): Adhesive composed of 100 parts by mass of an epoxy resin, 5 to 35 parts by mass of a phenol novolac resin, and 5 to 10 parts by mass of a solvent having an SP value of 7.0 to 10.7 $(cal/cm^3)^{1/2}$.

In these adhesives (X1) to (X6), preferable aspects of each of the epoxy resin, the organic phosphorus compound, and the elastomer can be appropriately combined.

When the adhesion part 41 is formed by an epoxy resin-based adhesive containing an epoxy resin having a Tg of 120 to 180° C., an epoxy resin curing agent, and an elastomer, the average tensile modulus of elasticity at a room temperature of the adhesion part 41 is preferably 1500 to 5000 MPa and the average tensile modulus of elasticity at 150° C. thereof is preferably 1000 to 3000 MPa. In this case, it is more preferable to form the adhesion part 41 by an epoxy resin-based adhesive composed of 100 parts by mass of an epoxy resin having a Tg of 120 to 180° C., 5 to 35 parts by mass of an epoxy resin curing agent, and 5 to 50 parts by mass of an elastomer.

The average tensile modulus of elasticity of the adhesion part 41 at a room temperature is preferably 1500 to 5000 MPa and more preferably 1500 to 4000 MPa. When the average tensile modulus of elasticity at a room temperature is equal to or larger than the lower limit value of the range, the iron loss characteristics of the laminated core are excellent. When the average tensile modulus of elasticity at a room temperature is equal to or smaller than the upper limit value of the range, the bonding strength of the laminated core is excellent.

Additionally, the average tensile modulus of elasticity at a room temperature is a value measured at 25° C. by a resonance method after making a measurement sample. Specifically, the sample can be obtained by adhering two electrical steel sheets 40 by an adhesive to be measured and curing the adhesive to form the adhesion part 41. The average tensile modulus of elasticity for the sample is measured by a resonance method according to JIS R 1602: 1995. Then, the average tensile modulus of elasticity of the single adhesion part 41 is obtained by excluding the influence of the electrical steel sheet 40 itself by the calculation from the average tensile modulus of elasticity (the measured value) of the sample.

Since the tensile modulus of elasticity obtained from the sample in this way is equal to an average value of the entire laminated core, this value is regarded as the average tensile modulus of elasticity. The composition is set such that the average tensile modulus of elasticity hardly changes depending on the stacking position in the stacking direction or the circumferential position of the laminated core around the central axis. Therefore, the average tensile modulus of elasticity E can be set to a value obtained by measuring the adhesion part 41 after curing at the upper end position of the laminated core.

Further, the average tensile modulus of elasticity of the adhesion part 41 at 150° C. is preferably 1000 to 3000 MPa, more preferably 1000 to 2800 MPa, and even more preferably 1000 to 2500. When the average tensile modulus of elasticity at 150° C. is equal to or larger than the lower limit value of the range, the bonding strength of the laminated core is excellent. When the average tensile modulus of elasticity at 150° C. is equal to or smaller than the upper limit value of the range, the iron loss characteristics of the laminated core are excellent.

Additionally, the average tensile modulus of elasticity at 150° C. is a value measured at 150° C. by a resonance method. The average tensile modulus of elasticity at 150° C. is measured by the same method as that of the average tensile modulus of elasticity at a room temperature other than the measurement temperature.

In order to obtain stable and sufficient adhesion strength, the thickness of the adhesion part 41 is preferably 1 µm or more.

On the other hand, when the thickness of the adhesion part 41 exceeds 100 µm, the adhesion force becomes saturated. Further, as the adhesion part 41 becomes thick, a space factor decreases and magnetic properties such as iron loss of the stator core decrease. Thus, the thickness of the adhesion part 41 is preferably 1 µm or more and 100 µm or less and more preferably 1 µm or more and 10 µm or less.

In the description above, the thickness of the adhesion part 41 means the average thickness of the adhesion part 41.

The average thickness of the adhesion part 41 is more preferably 1.0 µm or more and 3.0 µm or less. When the average thickness of the adhesion part 41 is smaller than 1.0 µm, a sufficient adhesion force cannot be obtained as described above. Therefore, the lower limit value of the average thickness of the adhesion part 41 is 1.0 µm and more preferably 1.2 µm. In contrast, when the average thickness of the adhesion part 41 becomes thicker than 3.0 µm, a problem arises in that the strain amount of the electrical steel sheet 40 largely increases due to the shrink at the time of thermosetting. Therefore, the upper limit value of the average thickness of the adhesion part 41 is 3.0 µm and more preferably 2.6 µm.

The average thickness of the adhesion part 41 is an average value of the laminated core as a whole. The average thickness of the adhesion part 41 hardly changes depending on the stacking position in the stacking direction or the circumferential position of the laminated core around the central axis. Therefore, the average thickness of the adhesion part 41 can be set as the average value of the numerical values measured at ten or more positions in the circumferential direction at the upper end position of the laminated core.

Additionally, the average thickness of the adhesion part 41 can be adjusted by changing, for example, the application amount of the adhesive. Further, the average tensile modulus of elasticity of the adhesion part 41 can be adjusted by changing, for example, the heating conditions and pressure conditions applied at the time of adhering, the type of curing agent, and the like.

Figure 3:
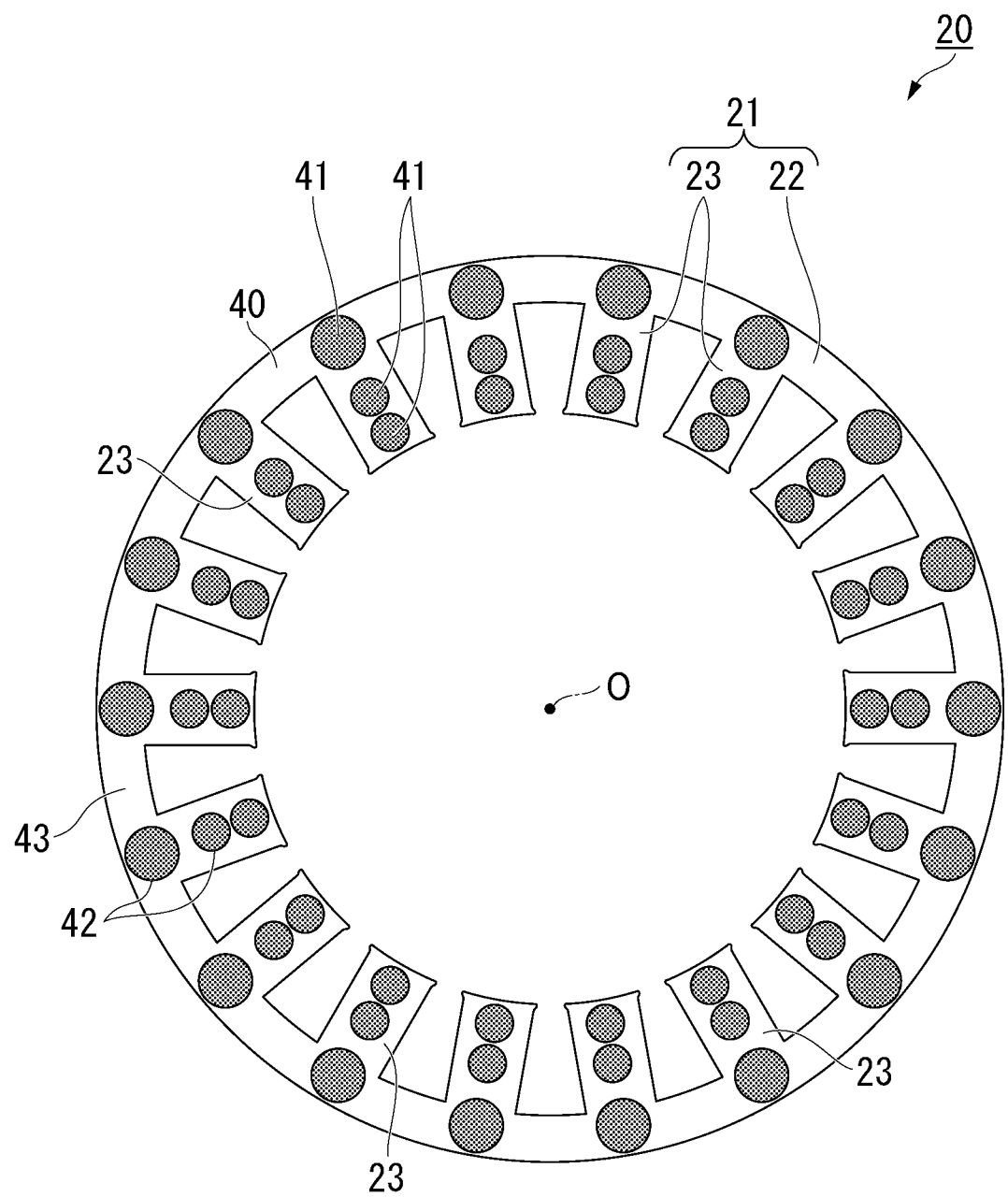
FIG. 3 is a cross-sectional view taken along a line A-A of FIG. 2 and is a view showing an arrangement pattern example of an adhesion part of the adhesively-laminated core for a stator.

The adhesion part 41 is provided at a plurality of positions between the electrical steel sheets 40 which are adjacent to each other in the stacking direction. That is, a surface (a first surface) facing the stacking direction in the electrical steel sheet 40 is provided with an adhesion region 42 and a non-adhesion region 43 as shown in FIG. 3. The adhesion region 42 is a region provided with the adhesion part 41 in the first surface of the electrical steel sheet 40, that is, a region provided with the adhesive (X) which is cured without being divided in the first surface of the electrical steel sheet 40. The non-adhesion region 43 is a region not provided with the adhesion part 41 in the first surface of the electrical steel sheet 40, that is, a region not provided with the adhesive (X) which is cured without being divided in the first surface of the electrical steel sheet 40. In the stator core 21, it is preferable that the adhesion part 41 is partially provided between the core back parts 22 and between the tooth parts 23 among the electrical steel sheets 40 adjacent to each other in the stacking direction.

Typically, the adhesion parts 41 are arranged to be distributed at a plurality of positions between the electrical steel sheets 40 adjacent to each other in the stacking direction.

FIG. 3 is an example of an arrangement pattern of the adhesion part 41. In this example, the adhesion parts 41 are formed in a plurality of circular dots. More specifically, the plurality of adhesion parts 41 are formed in the core back part 22 at the same angular intervals in the circumferential direction to have a dot shape having an average diameter of 12 mm. In each tooth part 23, the plurality of adhesion parts 41 are formed along the radial direction to have a dot shape having an average diameter of 8 mm.

The average diameter shown herein is an example. The average diameter of the dot-shaped adhesion part 41 of the core back part 22 is preferably 2 to 20 mm. The average diameter of the dot-shaped adhesion part 41 of each tooth part 23 is preferably 2 to 15 mm. Further, the formation pattern of FIG. 3 is an example and the number, shape, and arrangement of the adhesion part 41 provided between the electrical steel sheets 40 can be appropriately changed if necessary.

The average diameter is obtained by measuring a diameter of an adhesive mark of the adhesion part 41 from which the electrical steel sheet 40 is peeled off by a ruler. If the shape of the adhesive mark in a plan view is not a perfect circle, its diameter shall be the diameter of the circumscribed circle (perfect circle) of the adhesive mark in a plan view.

(Laminated Core Manufacturing Method)

Hereinafter, a method of manufacturing an adhesively-laminated core for a stator according to an embodiment of the present invention will be described with reference to the drawings.

The stator core 21 can be manufactured by repeating an operation of applying the adhesive (X) to a plurality of positions on a surface of the electrical steel sheet 40, stacking the electrical sheet 40 on another electrical sheet, press-stacking the electrical steel sheets, and forming the adhesion part is repeated.

Hereinafter, a method of manufacturing the stator core 21 using a manufacturing device 100 shown in FIG. 4 will be described.

First, the manufacturing device 100 will be described. In the manufacturing device 100, an electrical steel sheet P is punched multiple times by the molds disposed at each station to be gradually changed into the shape of the electrical steel sheet 40 while being fed from the winding C (the hoop) in the direction of an arrow F, the adhesive (X) is applied to a predetermined position of the lower surface of the second and subsequent electrical steel sheets 40, and the punched electrical steel sheets 40 are sequentially stacked and crimped.

Figure 4:
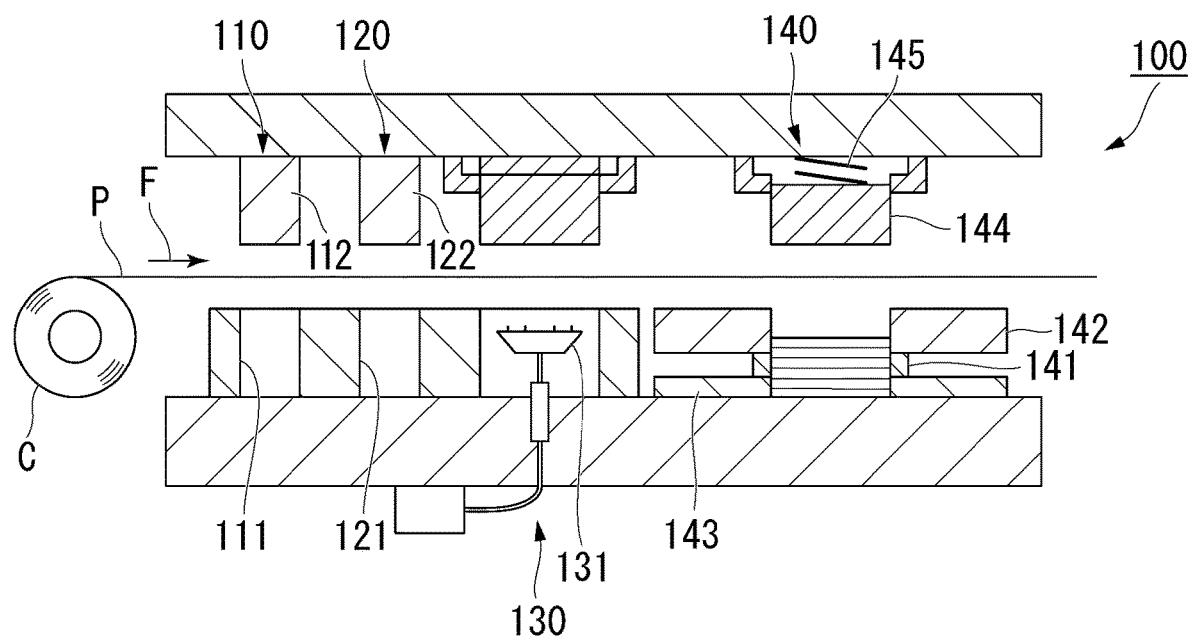
FIG. 4 is a side view showing a schematic configuration of a device manufacturing the adhesively-laminated core for a stator.

As shown in FIG. 4, the manufacturing device 100 includes a first-stage punching station 110 which is closest to the winding C, a second-stage punching station 120 which is disposed to be close to the downstream side in the conveying direction of the electrical steel sheet P in relation to the punching station 110, and an adhesive-coating station 130 which is disposed to be close to the further downstream side in relation to the punching station 120.

The punching station 110 includes a fixed mold 111 which is disposed below the electrical steel sheet P and a male mold 112 which is disposed above the electrical steel sheet P.

The punching station 120 includes a fixed mold 121 which is disposed below the electrical steel sheet P and a male mold 122 which is disposed above the electrical steel sheet P.

The adhesive-coating station 130 includes an applicator 131 having a plurality of injectors disposed according to the arrangement pattern of the adhesion parts 41.

The manufacturing device 100 further includes a stacking station 140 which is disposed at a position on the downstream side of the adhesive-coating station 130. The stacking station 140 includes a heating device 141, a fixed mold 142 for outer shape, a heat insulation member 143, a male mold 144 for outer shape, and a spring 145.

The heating device 141, the fixed mold 142 for outer shape, and the heat insulation member 143 are disposed below the electrical steel sheet P.

The male mold 144 for outer shape and the spring 145 are disposed above the electrical steel sheet P.

<Punching Step>

In the manufacturing device 100 with the above-described configuration, the electrical steel sheet P is first sequentially fed from the winding C in the direction of an arrow F of FIG. 4. Then, the electrical steel sheet P is first subjected to punching by the punching station 110. Next, the electrical steel sheet P is subjected to punching by the punching station 120. By these punching processes, the electrical steel sheet P can have the shape of the electrical steel sheet 40 having the core back part 22 and the plurality of tooth parts 23 shown in FIG. 3. However, since the steel sheet is not completely punched at this point, the process proceeds to the next step in the direction of an arrow F.

<Applying Step>

In the adhesive-coating station 130 of the next step, the adhesive (X) is supplied from each injector of the applicator 131 so that the adhesive (X) is applied to a plurality of positions of the lower surface of the electrical steel sheet 40 in a dot shape.

<Stacking Step>

Next, the electrical steel sheet P is fed to the stacking station 140, is punched by the male mold 144 for outer shape, and is stacked with high accuracy. For example, when a notch is formed at a plurality of positions of the outer peripheral end of the core back part and a scale is pressed against the notch from the side surface, it is possible to prevent the electrical steel sheets 40 from shifting and to stack them with higher accuracy. At the time of stacking, the electrical steel sheet 40 receives a constant pressure from the spring 145. When the adhesive (X) is of a thermosetting type, the adhesive is heated by the heating device 141, for example, at 150 to 160° C. to promote the curing.

When the punching step, the applying step, and the stacking step described above are repeated sequentially, a predetermined number of the electrical steel sheets 40 can be stacked with the adhesion parts 41 interposed therebetween.

With the aforementioned steps, the stator core 21 is completed.

The technical scope of the present invention is not limited to the aforementioned embodiment and various modifications can be made without departing from the gist of the present invention.

The shape of the stator core is not limited to the form shown in the aforementioned embodiment. Specifically, the dimensions of the outer diameter and the inner diameter of the stator core, the lamination thickness, the number of slots, the dimensional ratio between the circumferential direction and the radial direction of the tooth part, the dimensional ratio between the tooth part and the core back part in the radial direction, and the like can be arbitrarily designed according to the characteristic of the desired electric motor.

In the rotor of the aforementioned embodiment, one set of two permanent magnets 32 forms one magnetic pole, but the present invention is not limited thereto. For example, one permanent magnet 32 may form one magnetic pole and three or more permanent magnets 32 may form one magnetic pole.

In the aforementioned embodiment, an example in which the electric motor is a permanent magnetic electric motor has been described, but the structure of the electric motor is not limited thereto as shown below. The structure of the electric motor may further employ various known structures not shown below.

In the aforementioned embodiment, an example in which the electric motor is a permanent magnetic electric motor has been described, but the present invention is not limited thereto. For example, the electric motor may be a reluctance motor or an electromagnet field motor (a wound-field motor).

In the aforementioned embodiment, an example in which the AC motor is a synchronous motor has been described, but the present invention is not limited thereto. For example, the electric motor may be an induction motor.

In the aforementioned embodiment, an example in which the motor is an AC motor has been described, but the present invention is not limited thereto. For example, the electric motor may be a DC motor.

In the aforementioned embodiment, an example in which the electric motor is a motor has been described, but the present invention is not limited thereto. For example, the electric motor may be a generator.

In the aforementioned embodiment, a case in which the laminated core according to the present invention is applied to the stator core has been exemplified, but the laminated core can be also applied to the rotor core.

The laminated core can be used in a transformer instead of the electric motor. In this case, a grain-oriented electrical steel sheet can be employed as the electrical steel sheet instead of the non-grain-oriented electrical steel sheet.

In addition, it is possible to replace the components in the above embodiment with well-known components as appropriate without departing from the gist of the present invention. Further, the aforementioned modified examples may be appropriately combined with each other.

Hereinafter, the present invention will be described in detail by examples, but the present invention is not limited to the description below.

[Sp Value]

The SP value of the adhesive was measured by the following method. The adhesive was applied to the surface of the non-grain-oriented electrical steel sheet and was heated at 120° C. to be cured. The SP value of the solvent when the cured product was peeled off by rubbing various solvents having known SP values shown in Table 1 and dissolving the solvent in the cured product was set to the SP value of the adhesive.

In the measurement of the SP value of the adhesive, each solvent shown in Table 1 and a mixed solvent obtained by appropriately mixing two types of them to adjust the SP value were prepared and the SP value was made to be measured in 0.1 increments in the range of 7.0 to 11.4. When the cured product was dissolved in a plurality of solvents and peeled off, the SP value of the solvent from which the cured product was most easily peeled off among the solvents was taken as the SP value of the adhesive.

TABLE 1

| SOLVENT | SP VALUE [ $(cal/cm^3)^{1/2}$ ] |
|---|---|
| n-pentane | 7.0 |
| n-hexane | 7.3 |
| diethyl ether | 7.4 |
| n-octane | 7.6 |
| vinyl chloride | 7.8 |
| cyclohexane | 8.2 |
| isobutyl acetate | 8.3 |
| isopropyl acetate | 8.4 |
| butyl acetate | 8.5 |
| carbon tetrachloride | 8.6 |
| methylpropylketone | 8.7 |
| xylene | 8.8 |
| toluene | 8.9 |
| ethyl acetate | 9.1 |
| benzene | 9.2 |
| methyl ethyl ketone | 9.3 |
| methylene chloride | 9.7 |
| acetone | 9.9 |
| carbon disulfide | 10.0 |
| acetic acid | 10.1 |
| n-hexanol | 10.7 |
| cyclohexanol | 11.4 |

[Tensile Modulus of Elasticity]

The average tensile modulus of elasticity at a room temperature was measured at 25° C. by a resonance method. The average tensile modulus of elasticity at 150° C. was measured by the same method as that of the average tensile modulus of elasticity at a room temperature except that the measurement temperature was 150° C.

Example 1

An adhesive (X-1) was prepared by mixing 100 parts by mass of a bisphenol F type epoxy resin (Tg: 130° C.) obtained by polymerizing epichlorohydrin and bisphenol F and 20 parts by mass of a phenol novolac resin as an epoxy resin curing agent. The SP value of the obtained adhesive (X-1) was 8.1 $(cal/cm^3)^{1/2}$.

A test piece for shear tension to be described later was made by using the adhesive (X-1) and oil accommodating adhesiveness was evaluated. Further, the vibration and noise of the laminated core made by using the adhesive (X-1) were also evaluated.

Example 2

An adhesive (X-2) was prepared by mixing 100 parts by mass of a bisphenol F type epoxy resin (Tg: 130° C.) obtained by polymerizing epichlorohydrin and bisphenol F and 25 parts by mass of hexamethylphosphoric acid triamide as an organophosphorus compound. The SP value of the obtained adhesive (X-2) was 8.5 $(cal/cm^3)^{1/2}$.

The oil accommodating adhesiveness, vibration, and noise were evaluated similarly to Example 1 except that the adhesive (X-2) was used instead of the adhesive (X-1).

Example 3

An adhesive (X-3) was prepared by mixing 100 parts by mass of a bisphenol F type epoxy resin (Tg: 130° C.) obtained by polymerizing epichlorohydrin and bisphenol F, 20 parts by mass of a phenol novolac resin as an epoxy resin curing agent, and 5 parts by mass of EPDM as an elastomer. The SP value of the obtained adhesive (X-3) was 8.2 $(cal/cm^3)^{1/2}$.

The oil accommodating adhesiveness, vibration, and noise were evaluated similarly to Example 1 except that the adhesive (X-3) was used instead of the adhesive (X-1). Further, the average tensile modulus of elasticity at a room temperature of the adhesion part was 3000 MPa and the average tensile modulus of elasticity at 150° C. thereof was 2000 MPa.

Example 4

An adhesive (X-4) was prepared by mixing 60 parts by mass of methyl methacrylate and 40 parts by mass of cyclohexyl methacrylate. The SP value of the obtained adhesive (X-4) was 10.2 $(cal/cm^3)^{1/2}$.

The oil accommodating adhesiveness, vibration, and noise were evaluated similarly to Example 1 except that the adhesive (X-4) was used instead of the adhesive (X-1).

Example 5

An adhesive (X-5) was prepared by mixing 100 parts by mass of a bisphenol F type epoxy resin (Tg: 130° C.) obtained by polymerizing epichlorohydrin and bisphenol F, 20 parts by mass of a phenol novolac resin as an epoxy resin curing agent, and 5 parts by mass of cyclohexane as a solvent. The SP value of the obtained adhesive (X-5) was 8.0 $(cal/cm^3)^{1/2}$.

The oil accommodating adhesiveness, vibration, and noise were evaluated similarly to Example 1 except that the adhesive (X-5) was used instead of the adhesive (X-1).

Example 6

An adhesive (X-6) was prepared by mixing 100 parts by mass of an acrylic modified epoxy resin (amount of acrylic resin: 30 mass %) obtained by graft-polymerizing an acrylic resin and 20 parts by mass of a phenol novolac resin as an epoxy resin curing agent. The SP value of the obtained adhesive (X-6) was 7.8 $(cal/cm^3)^{1/2}$.

The oil accommodating adhesiveness, vibration, and noise were evaluated similarly to Example 1 except that the adhesive (X-6) was used instead of the adhesive (X-1).

Example 7

An adhesive (X-7) was prepared by mixing 100 parts by mass of an acrylic modified epoxy resin (amount of acrylic resin: 30 mass %) obtained by graft-polymerizing an acrylic resin, 10 parts by mass of a phenol novolac resin as an epoxy resin curing agent, and 20 parts by mass of butadiene rubber as an elastomer. The SP value of the obtained adhesive (X-7) was 9.1 $(cal/cm^3)^{1/2}$.

The oil accommodating adhesiveness, vibration, and noise were evaluated similarly to Example 1 except that the adhesive (X-7) was used instead of the adhesive (X-1).

Example 8

An adhesive (X-8) was prepared by mixing 100 parts by mass of a bisphenol A type epoxy resin (Tg: 110° C.) obtained by polymerizing bisphenol A and epichlorohydrin and 20 parts by mass of a phenol novolac resin as an epoxy resin curing agent. The SP value of the obtained adhesive (X-8) was 8.0 $(cal/cm^3)^{1/2}$.

The oil accommodating adhesiveness, vibration, and noise were evaluated similarly to Example 1 except that the adhesive (X-8) was used instead of the adhesive (X-1).

Example 9

An adhesive (X-9) was prepared by mixing 100 parts by mass of a bisphenol F type epoxy resin (Tg: 130° C.) obtained by polymerizing epichlorohydrin and bisphenol F and 10 parts by mass of a phenol novolac resin as an epoxy resin curing agent. The SP value of the obtained adhesive (X-9) was 9.5 $(cal/cm^3)^{1/2}$.

The oil accommodating adhesiveness, vibration, and noise were evaluated similarly to Example 1 except that the adhesive (X-9) was used instead of the adhesive (X-1).

Example 10

An adhesive (X-10) was prepared by mixing 100 parts by mass of a bisphenol F type epoxy resin (Tg: 130° C.) obtained by polymerizing epichlorohydrin and bisphenol F and 30 parts by mass of a phenol novolac resin as an epoxy resin curing agent. The SP value of the obtained adhesive (X-10) was 7.9 $(cal/cm^3)^{1/2}$.

The oil accommodating adhesiveness, vibration, and noise were evaluated similarly to Example 1 except that the adhesive (X-10) was used instead of the adhesive (X-1).

Example 11

An adhesive (X-11) was prepared by mixing 100 parts by mass of a bisphenol F type epoxy resin (Tg: 130° C.) obtained by polymerizing epichlorohydrin and bisphenol F and 10 parts by mass of hexamethylphosphoric acid triamide as an organophosphorus compound. The SP value of the obtained adhesive (X-11) was 9.9 $(cal/cm^3)^{1/2}$.

The oil accommodating adhesiveness, vibration, and noise were evaluated similarly to Example 1 except that the adhesive (X-11) was used instead of the adhesive (X-1).

Example 12

An adhesive (X-12) was prepared by mixing 100 parts by mass of a bisphenol F type epoxy resin (Tg: 130° C.) obtained by polymerizing epichlorohydrin and bisphenol F, 20 parts by mass of a phenol novolac resin as an epoxy resin curing agent, and 40 parts by mass of EPDM as an elastomer. The SP value of the obtained adhesive (X-12) was 7.9 $(cal/cm^3)^{1/2}$.

The oil accommodating adhesiveness, vibration, and noise were evaluated similarly to Example 1 except that the adhesive (X-12) was used instead of the adhesive (X-1).

Further, the average tensile modulus of elasticity at a room temperature of the adhesion part was 1600 MPa and the average tensile modulus of elasticity at 150° C. thereof was 1100 MPa.

Example 13

An adhesive (X-13) was prepared by mixing 100 parts by mass of a bisphenol F type epoxy resin (Tg: 130° C.) obtained by polymerizing epichlorohydrin and bisphenol F, 20 parts by mass of a phenol novolac resin as an epoxy resin curing agent, and 30 parts by mass of cyclohexane as a solvent. The SP value of the obtained adhesive (X-13) was 7.8 $(cal/cm^3)^{1/2}$.

The oil accommodating adhesiveness, vibration, and noise were evaluated similarly to Example 1 except that the adhesive (X-13) was used instead of the adhesive (X-1).

Example 14

An adhesive (X-14) was prepared by mixing 100 parts by mass of an acrylic modified epoxy resin (amount of acrylic resin: 60 mass %) obtained by graft-polymerizing an acrylic resin and 10 parts by mass of a phenol novolac resin as an epoxy resin curing agent. The SP value of the obtained adhesive (X-14) was 7.9 $(cal/cm^3)^{1/2}$.

The oil accommodating adhesiveness, vibration, and noise were evaluated similarly to Example 1 except that the adhesive (X-14) was used instead of the adhesive (X-1).

Example 15

An adhesive (X-15) was prepared by mixing 100 parts by mass of a glycidylamine type epoxy resin (Tg: 160° C.) and 25 parts by mass of hexamethylphosphoric acid triamide as an organophosphorus compound. The SP value of the obtained adhesive (X-15) was 8.4 $(cal/cm^3)^{1/2}$.

The oil accommodating adhesiveness, vibration, and noise were evaluated similarly to Example 1 except that the adhesive (X-15) was used instead of the adhesive (X-1).

Comparative Example 1

An adhesive (Y-1) was prepared by mixing 100 parts by mass of a bisphenol F type epoxy resin (Tg: 130° C.) obtained by polymerizing epichlorohydrin and bisphenol F and 3 parts by mass of a phenol novolac resin as an epoxy resin curing agent. The SP value of the obtained adhesive (Y-1) was 10.8 $(cal/cm^3)^{1/2}$.

A test piece for shear tension to be described later was made by using the adhesive (Y-1) instead of the adhesive (X-1) and the oil accommodating adhesiveness was evaluated.

Comparative Example 2

An adhesive (Y-2) was prepared by mixing 100 parts by mass of a bisphenol F type epoxy resin (Tg: 130° C.) obtained by polymerizing epichlorohydrin and bisphenol F and 2 parts by mass of hexamethylphosphoric acid triamide as an organophosphorus compound. The SP value of the obtained adhesive (Y-2) was 10.9 $(cal/cm^3)^{1/2}$.

A test piece for shear tension to be described later was made by using the adhesive (Y-2) instead of the adhesive (X-1) and oil accommodating adhesiveness was evaluated.

Comparative Example 3

An adhesive (Y-3) was prepared by mixing 100 parts by mass of a bisphenol F type epoxy resin (Tg: 130° C.)

obtained by polymerizing epichlorohydrin and bisphenol F, 3 parts by mass of a phenol novolac resin as an epoxy resin curing agent, and 1 parts by mass of EPDM as an elastomer. The SP value of the obtained adhesive (Y-3) was 10.8 $(cal/cm^3)^{1/2}$.

A test piece for shear tension to be described later was made by using the adhesive (Y-3) instead of the adhesive (X-1) and the oil accommodating adhesiveness was evaluated. Further, the average tensile modulus of elasticity at a room temperature of the adhesion part was 1200 MPa and the average tensile modulus of elasticity at 150° C. thereof was 800 MPa.

Comparative Example 4

An adhesive (Y-4) was prepared by mixing 80 parts by mass of isobutyl methacrylate and 20 parts by mass of polymethyl methacrylate. The SP value of the obtained adhesive (Y-4) was 7.5 $(cal/cm^3)^{1/2}$.

A test piece for shear tension to be described later was made by using the adhesive (Y-4) instead of the adhesive (X-1) and oil accommodating adhesiveness was evaluated.

Comparative Example 5

An adhesive (Y-5) was prepared by mixing 100 parts by mass of a bisphenol F type epoxy resin (Tg: 130° C.) obtained by polymerizing epichlorohydrin and bisphenol F, 3 parts by mass of a phenol novolac resin as an epoxy resin curing agent, and 5 parts by mass of cyclohexanol as a solvent. The SP value of the obtained adhesive (Y-5) was 11.0 $(cal/cm^3)^{1/2}$.

The oil accommodating adhesiveness, vibration, and noise were evaluated similarly to Example 1 except that the adhesive (Y-5) was used instead of the adhesive (X-1).

Comparative Example 6

An adhesive (Y-6) was prepared by mixing 100 parts by mass of an acrylic modified epoxy resin (amount of acrylic resin: 85 mass %) obtained by graft-polymerizing an acrylic resin and 20 parts by mass of a phenol novolac resin as an epoxy resin curing agent. The SP value of the obtained adhesive (Y-6) was 7.0 $(cal/cm^3)^{1/2}$.

The oil accommodating adhesiveness, vibration, and noise were evaluated similarly to Example 1 except that the adhesive (Y-6) was used instead of the adhesive (X-1).

Comparative Example 7

An adhesive (Y-7) was prepared by mixing 100 parts by mass of an acrylic modified epoxy resin (amount of acrylic resin: 75 mass %) obtained by graft-polymerizing an acrylic resin, 20 parts by mass of a phenol novolac resin as an epoxy resin curing agent, and 60 parts by mass of ethylene propylene diene rubber (EPDM) as an elastomer. The SP value of the obtained adhesive (Y-7) was 7.4 $(cal/cm^3)^{1/2}$.

The oil accommodating adhesiveness, vibration, and noise were evaluated similarly to Example 1 except that the adhesive (Y-7) was used instead of the adhesive (X-1).

Comparative Example 8

An adhesive (Y-8) was prepared by mixing 100 parts by mass of a bisphenol A type epoxy resin (Tg: 105° C.) obtained by polymerizing bisphenol A and epichlorohydrin and 3 parts by mass of a phenol novolac resin as an epoxy resin curing agent. The SP value of the obtained adhesive (Y-8) was 10.8 $(cal/cm^3)^{1/2}$.

The oil accommodating adhesiveness, vibration, and noise were evaluated similarly to Example 1 except that the adhesive (Y-8) was used instead of the adhesive (X-1).

Comparative Example 9

An adhesive (Y-9) was prepared by mixing 100 parts by mass of a bisphenol F type epoxy resin (Tg: 130° C.) obtained by polymerizing epichlorohydrin and bisphenol F and 40 parts by mass of a phenol novolac resin as an epoxy resin curing agent. The SP value of the obtained adhesive (Y-9) was 7.5 $(cal/cm^3)^{1/2}$.

The oil accommodating adhesiveness, vibration, and noise were evaluated similarly to Example 1 except that the adhesive (Y-9) was used instead of the adhesive (X-1).

Comparative Example 10

An adhesive (Y-10) was prepared by mixing 100 parts by mass of a bisphenol F type epoxy resin (Tg: 130° C.) obtained by polymerizing epichlorohydrin and bisphenol F and 40 parts by mass of hexamethylphosphoric acid triamide as an organophosphorus compound. The SP value of the obtained adhesive (Y-10) was 7.7 $(cal/cm^3)^{1/2}$.

The oil accommodating adhesiveness, vibration, and noise were evaluated similarly to Example 1 except that the adhesive (Y-10) was used instead of the adhesive (X-1).

Comparative Example 11

An adhesive (Y-11) was prepared by mixing 100 parts by mass of a bisphenol F type epoxy resin (Tg: 130° C.) obtained by polymerizing epichlorohydrin and bisphenol F, 20 parts by mass of a phenol novolac resin as an epoxy resin curing agent, and 60 parts by mass of EPDM as an elastomer. The SP value of the obtained adhesive (Y-11) was 7.6 $(cal/cm^3)^{1/2}$.

The oil accommodating adhesiveness, vibration, and noise were evaluated similarly to Example 1 except that the adhesive (Y-11) was used instead of the adhesive (X-1).

[Evaluation of Oil Accommodating Adhesiveness]

The oil accommodating adhesiveness was evaluated according to the following evaluation criteria by preparing a test piece for shear tension according to JIS K 6850:1999 and measuring the adhesion strength.

Two rectangular test steel sheets (having a width 25 mm×a length of 100 mm) were cut out from a steel sheet having a thickness of 0.3 mm and having a composition for a non-grain-oriented electrical steel sheet containing Si: 3.0 mass %, Al: 0.5 mass %, and Mn: 0.1 mass %. Mineral oil (SP value: 8.5 $(cal/cm^3)^{1/2}$) which is punching oil was applied to a whole one surface of each test steel sheet so that the application amount was 50 mg/m². An adhesive was applied to a part from a leading end of an oil surface of one test steel sheet to a position of 10 mm so that the application amount was 1 g/m² and another test steel sheet was overlapped on the test steel sheet so that their oil surfaces face each other while being in contact at a part from the leading end to the position of 10 mm. They were heated and pressed in the conditions of a temperature of 100° C. and a pressure of 100 Pa so that a test piece for shear tension was obtained.

The tensile test environment was a room temperature (25° C.). The test speed was 3 mm/minute. The result is shown in Table 2.

(Evaluation Criteria)

A: Adhesion strength equal to or larger than 250 kgf/cm².
B: Adhesion strength equal to or larger than 200 kgf/cm² and smaller than 250 kgf/cm².
C: Adhesion strength equal to or larger than 150 kgf/cm² and smaller than 200 kgf/cm².
D: Adhesion strength equal to or larger than 100 kgf/cm² and smaller than 150 kgf/cm².
E: Adhesion strength equal to or larger than 70 kgf/cm² and smaller than 100 kgf/cm².
F: Adhesion strength equal to or larger than 50 kgf/cm² and smaller than 70 kgf/cm².
G: Adhesion strength equal to or larger than 10 kgf/cm² and smaller than 50 kgf/cm².
H: Adhesion strength smaller than 10 kgf/cm².

[Noise Vibration Evaluation]
(Manufacturing of Test Stator Core)

A hoop having a composition for non-oriented electrical steel sheets containing Si: 3.0 mass %, Al: 0.5 mass %, and Mn: 0.1 mass % was prepared. The thickness of the base steel was 0.3 mm. An insulation coating treatment agent containing a metal phosphate and an acrylic resin emulsion was applied to the hoop and was baked at 300° C. to apply a predetermined amount of insulating coating.

This hoop (electrical steel sheet) was punched into a single-plate core having eighteen rectangular tooth parts on the inner radial side to have a length of 30 mm and a width of 15 mm in an annular shape having an outer diameter of 300 mm and an inner diameter of 240 mm according to the following steps by using the manufacturing device 100 having a configuration shown in FIG. 4 and the single-plate cores were sequentially stacked to make a stator core.

The hoop was sequentially fed from the winding C in the direction of an arrow F of FIG. 4. Then, this hoop was first punched by the punching station 110 and then this hoop was punched by the punching station 120. By these punching processes, the hoop was formed into the shape of the electrical steel sheet 40 including the core back part 22 and the plurality of tooth parts 23 shown in FIG. 3 (punching step).

Next, the adhesive of each example was applied to a predetermined position of the lower surface (first surface) of the core back part 22 and the tooth part 23 of the hoop in a dot shape as shown in FIG. 3 by the adhesive-coating station 130 and the applicator 131 (applying step). The average diameter of the adhesion part of the tooth part 23 was 5 mm and the average diameter of the adhesion part of the core back part 22 was 7 mm.

Next, the hoop fed to the stacking station 150 was punched into a single-plate core by the male mold 154 for outer shape and the single-plate cores were stacked in a pressed state (stacking step). At this time, the single-plate cores were heated at 80° C. by the heating device 151 to promote the curing of the adhesive.

The punching step, the applying step, and the stacking step were sequentially repeated to obtain a test stator core in which 130 single-plate cores were stacked.

(Hammering Test (Noise Vibration Evaluation))

An outer peripheral end of the core back part of the made test stator core was vibrated in the radial direction by an impact hammer and a modal analysis of noise and vibration was performed with the tip of the tooth part and the center of the core back part at 180° in the axial direction with respect to the vibration source as the measurement points. Further, even when the center of the core back part in the radial direction was axially vibrated by an impact hammer, a modal analysis of noise and vibration was performed with the tip of the tooth part and the center of the core back part at 180° in the axial direction with respect to the vibration source as the measurement points. The evaluation was performed according to the following criteria. This means that the noise and vibration can be suppressed as the numerical value becomes smaller.

1: Only one or two vibration peaks are detected.
2: Several vibration peaks are detected.
3: Ten or more vibration peaks are detected depending on the vibration direction.
4: Although there is a main peak, ten or more vibration peaks are detected.
5: There is no main peak and ten or more vibration peaks are detected.

TABLE 2

| | ADHESIVE | | OIL ACCOMMODATING ADHESIVENESS | | NOISE VIBRATION EVALUATION |
|---|---|---|---|---|---|
| | TYPE | SP VALUE [(cal/cm³)^{1/2}] | ADHESION STRENGTH [kgf/cm²] | EVALULATION | |
| EXAMPLE 1 | X-1 | 8.1 | 220 | B | 2 |
| EXAMPLE 2 | X-2 | 8.5 | 260 | A | 1 |
| EXAMPLE 3 | X-3 | 8.2 | 250 | A | 1 |
| EXAMPLE 4 | X-4 | 10.2 | 160 | C | 3 |
| EXAMPLE 5 | X-5 | 8.0 | 200 | B | 2 |
| EXAMPLE 6 | X-6 | 7.8 | 150 | C | 3 |
| EXAMPLE 7 | X-7 | 9.1 | 240 | B | 2 |
| EXAMPLE 8 | X-8 | 8.0 | 210 | B | 2 |
| EXAMPLE 9 | X-9 | 9.5 | 220 | B | 2 |
| EXAMPLE 10 | X-10 | 7.9 | 160 | C | 3 |
| EXAMPLE 11 | X-11 | 9.9 | 210 | B | 2 |
| EXAMPLE 12 | X-12 | 7.9 | 170 | C | 3 |
| EXAMPLE 13 | X-13 | 7.8 | 160 | C | 3 |
| EXAMPLE 14 | X-14 | 7.9 | 170 | C | 3 |
| EXAMPLE 15 | X-15 | 8.4 | 270 | A | 1 |
| COMPARATIVE EXAMPLE 1 | Y-1 | 10.8 | 140 | D | 4 |
| COMPARATIVE EXAMPLE 2 | Y-2 | 10.9 | 130 | D | 4 |
| COMPARATIVE EXAMPLE 3 | Y-3 | 10.8 | 140 | D | 4 |

TABLE 2-continued

| | ADHESIVE | | OIL ACCOMMODATING ADHESIVENESS | | NOISE VIBRATION EVALUATION |
|---|---|---|---|---|---|
| | TYPE | SP VALUE [(cal/cm$^3$)$^{1/2}$] | ADHESION STRENGTH [kgf/cm$^2$] | EVALULATION | |
| COMPARATIVE EXAMPLE 4 | Y-4 | 7.5 | 65 | F | 5 |
| COMPARATIVE EXAMPLE 5 | Y-5 | 11.0 | 90 | E | 5 |
| COMPARATIVE EXAMPLE 6 | Y-6 | 7.0 | 5 | H | 5 |
| COMPARATIVE EXAMPLE 7 | Y-7 | 7.4 | 20 | G | 5 |
| COMPARATIVE EXAMPLE 8 | Y-8 | 10.8 | 140 | D | 4 |
| COMPARATIVE EXAMPLE 9 | Y-9 | 7.5 | 60 | F | 5 |
| COMPARATIVE EXAMPLE 10 | Y-10 | 7.7 | 45 | G | 5 |
| COMPARATIVE EXAMPLE 11 | Y-11 | 7.6 | 35 | G | 5 |

INDUSTRY APPLICABILITY

According to the present invention, it is possible to improve an adhesion strength between punched electrical steel sheets in a laminated core. Thus, the industrial applicability is great.

BRIEF DESCRIPTION OF THE REFERENCE SYMBOLS

10 Electric motor
20 Stator
21 Adhesively-laminated core for stator
40 Electrical steel sheet
41 Adhesion part

The invention claimed is:

1. A laminated core comprising:
a plurality of electrical steel sheets which are stacked on each other and of which both surfaces are coated with an insulation coating; and
an adhesion part which is disposed between the electrical steel sheets adjacent to each other in a stacking direction and adheres the electrical steel sheets to each other,
wherein all sets of the electrical steel sheets adjacent to each other in the stacking direction are adhered to each other by a plurality of the adhesion parts between the electrical steel sheets,
wherein the adhesion parts are provided at a plurality of positions between the electrical steel sheets,
wherein the adhesion part is made of an adhesive having an SP value of 7.8 to 10.7 (cal/cm$^3$)$^{1/2}$, and
wherein the adhesive is an epoxy resin-based adhesive containing an epoxy resin and a phenol novolac resin.

2. The laminated core according to claim 1,
wherein the epoxy resin-based adhesive is an adhesive composed of 100 parts by mass of an epoxy resin and 5 to 35 parts by mass of a phenol novolac resin.

3. The laminated core according to claim 1,
wherein the epoxy resin-based adhesive is an adhesive composed of 100 parts by mass of an epoxy resin, 5 to 35 parts by mass of a phenol novolac resin, and 5 to 50 parts by mass of an elastomer.

4. The laminated core according to claim 1,
wherein the epoxy resin-based adhesive is an adhesive composed of 100 parts by mass of an epoxy resin, 5 to 35 parts by mass of a phenol novolac resin, and 5 to 35 parts by mass of a solvent having an SP value of 7.0 to 10.7 (cal/cm$^3$)$^{1/2}$.

5. The laminated core according to claim 1,
wherein the epoxy resin-based adhesive further contains an acrylic resin.

6. The laminated core according to claim 5,
wherein the epoxy resin-based adhesive is an adhesive composed of 100 parts by mass of an acrylic modified epoxy resin graft-polymerized with an acrylic resin and 5 to 35 parts by mass of a phenol novolac resin.

7. The laminated core according to claim 5,
wherein the epoxy resin-based adhesive is an adhesive composed of 100 parts by mass of an acrylic modified epoxy resin graft-polymerized with an acrylic resin, 5 to 35 parts by mass of a phenol novolac resin, and 5 to 50 parts by mass of an elastomer.

8. The laminated core according to claim 1,
wherein the laminated core is an adhesively-laminated core for a stator.

9. An electric motor comprising:
the laminated core according to claim 8.

10. An electric motor comprising:
the laminated core according to claim 1.

11. A method of manufacturing the laminated core according to claim 1,
wherein an operation of applying the adhesive to a surface of the electrical steel sheet, stacking the electrical sheet on another electrical sheet, press-stacking the electrical steel sheets, and forming the adhesion part is repeated.

12. A laminated core comprising:
a plurality of electrical steel sheets which are stacked on each other and of which both surfaces are coated with an insulation coating; and
an adhesion part which is disposed between the electrical steel sheets adjacent to each other in a stacking direction and adheres the electrical steel sheets to each other,
wherein all sets of the electrical steel sheets adjacent to each other in the stacking direction are adhered to each other by a plurality of the adhesion parts between the electrical steel sheets, wherein the adhesion parts are provided at a plurality of positions between the electrical steel sheets, wherein the adhesion part is made of an adhesive having an SP value of 7.8 to 10.7 $(\text{cal/cm}^3)^{1/2}$, and wherein the adhesive is an epoxy resin-based adhesive containing an epoxy resin having a glass transition temperature of 120 to 180° C. and an organophosphorus compound.

13. A laminated core comprising:

a plurality of electrical steel sheets which are stacked on each other and of which both surfaces are coated with an insulation coating; and an adhesion part which is disposed between the electrical steel sheets adjacent to each other in a stacking direction and adheres the electrical steel sheets to each other, wherein all sets of the electrical steel sheets adjacent to each other in the stacking direction are adhered to each other by a plurality of the adhesion parts between the electrical steel sheets, wherein the adhesion parts are provided at a plurality of positions between the electrical steel sheets, wherein the adhesion part is made of an adhesive having an SP value of 7.8 to 10.7 $(\text{cal/cm}^3)^{1/2}$, and wherein the adhesive is an epoxy resin-based adhesive composed of 100 parts by mass of an epoxy resin and 5 to 35 parts by mass of an organophosphorus compound.

14. A laminated core comprising:

a plurality of electrical steel sheets which are stacked on each other and of which both surfaces are coated with an insulation coating; and an adhesion part which is disposed between the electrical steel sheets adjacent to each other in a stacking direction and adheres the electrical steel sheets to each other, wherein all sets of the electrical steel sheets adjacent to each other in the stacking direction are adhered to each other by a plurality of the adhesion parts between the electrical steel sheets, wherein the adhesion parts are provided at a plurality of positions between the electrical steel sheets, wherein the adhesion part is made of an adhesive having an SP value of 7.8 to 10.7 $(\text{cal/cm}^3)^{1/2}$, wherein the adhesive is an epoxy resin-based adhesive containing an epoxy resin, an epoxy resin curing agent, and an elastomer, and wherein an average tensile modulus of elasticity of the adhesion part at a room temperature is 1500 to 5000 MPa and an average tensile modulus of elasticity thereof at 150° C. is 1000 to 3000 MPa.

* * * * *